United States Patent [19]
Derra et al.

[11] Patent Number: 5,997,143
[45] Date of Patent: Dec. 7, 1999

[54] OPTICAL PROJECTION DEVICES INCLUDING A LENS PLATE INTEGRATOR

[75] Inventors: Günther Derra, Aachen, Germany; Holger Mönch, Vaals, Netherlands

[73] Assignee: U.S. Philips Corporation, New York, N.Y.

[21] Appl. No.: 08/879,167

[22] Filed: Jun. 19, 1997

[30] Foreign Application Priority Data

Jun. 22, 1996 [DE] Germany ................... 196 24 991

[51] Int. Cl.⁶ .................................................. G03B 21/14
[52] U.S. Cl. .............................................. 353/38; 362/333
[58] Field of Search .................................. 353/20, 30, 31, 353/33, 34, 37, 38, 98, 10 L; 349/9; 355/67, 47; 362/268, 331; 359/622, 618, 619

[56] References Cited

U.S. PATENT DOCUMENTS

| 4,769,750 | 9/1988 | Matsumoto et al. | 362/268 |
| 5,359,455 | 10/1994 | Oishi et al. | 353/487 |
| 5,418,583 | 5/1995 | Masumoto | 353/38 |
| 5,649,753 | 7/1997 | Masumoto | 353/102 |
| 5,662,410 | 9/1997 | Shimizu et al. | 353/38 |
| 5,786,939 | 7/1998 | Watanabe | 359/621 |
| 5,806,950 | 9/1998 | Gale et al. | 353/78 |
| 5,865,521 | 2/1999 | Hashizume et al. | 353/38 |

FOREIGN PATENT DOCUMENTS 09146061  6/1997  Japan .

*Primary Examiner*—William Dowling
*Attorney, Agent, or Firm*—F. Brice Faller

[57] ABSTRACT

A lens plate integrator includes first and second lens plates which transmit light from a light source on an optical path to a projection plane. Each lens plate includes corresponding first and second groups of lens elements; light from the first group of the second plate is focused on a projection face in the projection plane, while light from the second group of the second plate is focused in front of or behind the projection plane and only partially illuminates the projection face.

10 Claims, 3 Drawing Sheets

OPTICAL PROJECTION DEVICES INCLUDING A LENS PLATE INTEGRATOR

BACKGROUND OF THE INVENTION

The invention relates to an optical projection device comprising a light source and a lens plate integrator which comprises a first lens plate having a predeterminable number of lens elements and arranged in the optical path between the light source and a projection plane, and a second lens plate having a predeterminable number of lens elements and arranged in the optical path between the first lens plate and the projection plane. Light from the light source is imaged by means of the lens elements of the first lens plate on the lens elements of the second lens plate associated with the lens elements of the first lens plate, and the light beams of the lens elements of the second lens plate superimposed on the projection plane by means of a prismatic arrangement of the lens elements of the second lens plate or by means of a condenser lens.

In such optical projection devices, a very uniform illumination of a projection face in the projection plane is achieved by means of the lens plate integrator which comprises at least two lens plates each having a predeterminable number of lens elements. This means that the light on the projection face has a very homogeneous intensity distribution, i.e. particularly the light distribution in the center area and the peripheral areas of the projection face is substantially the same. Such optical projection devices including a lens plate integrator have the additional advantages that the light distribution on the projection plane or on the projection faces is quite insensitive to small variations of the position of the light source. Moreover, the device is insensitive to mechanical tolerances of the overall system. It is also insensitive to inhomogeneities of the light source itself, which may be caused, for example, by faults in the reflector, by electric wires, etc. Furthermore, the projection face is illuminated in homogeneous colors.

An optical projection device of this type is known, for example, from U.S. Pat. No. 5,418,583. In this device, the second lens plate of the lens plate integrator comprises additional lens elements of different sizes. The lens elements arranged at the periphery of the second lens plate are slightly smaller than those arranged in the center area so as to allow for the differently sized image of the light source on the lens elements of the second lens plate. In any case, this device also has for its object that each light beam passed through the lens elements of the second lens plate is imaged on the projection plane in a maximally uniform way and completely covers a projection face on this plane.

OBJECTS AND SUMMARY OF THE INVENTION

It is an object of the invention to give the center area of the projection face a higher light intensity than its peripheral area, while maintaining the other advantages of optical devices with lens plate integrators.

According to the invention, a first group of lens elements of the first lens plate and a first group of associated lens elements of the second lens plate are provided, the light beams passed through the lens elements of the first group being focused on, and illuminating, a projection face in the projection plane. A second group of lens elements of the first lens plate and a second group of associated lens elements of the second lens plate are also, the light beams passed through the lens elements of the second group being focused on a plane in front of or behind the projection plane and illuminating only a part of the projection face.

A first group of lens elements is provided on the first lens plate as well as on the second lens plate. Associated with each lens element of the first group on the first plate is a lens element on the second plate, which lens element is also associated with the first group of the lens elements on this lens plate. The light source is imaged by the lens elements of the first group of the first lens plate on the lens elements of the first group of the second lens plate. The light beams passed through these lens elements of the first group of the second lens plate are superimposed on the projection face in the projection plane by means of a prismatic arrangement of these lens elements or by means of a condenser lens. The lens elements of the first group of the first lens plate and the first group of the second lens plate, as well as the further optical parts are implemented in such a way that the light beams are focused on the projection face. This is particularly recognizable because their edges are sharply imaged in the projection plane. This means that the light beams on the projection face always have the same size, fully illuminate the projection face and completely superimpose each other.

Moreover, lens elements associated with a second group are provided on the first lens plate as well as on the second lens plate. Also these lens elements are individually associated with each other and convey light beams projecting light onto the projection face. However, the light beams passed through the lens elements of the second groups are not focused on the projection plane. Instead, they are focused on a plane in front of or behind the projection plane. This means that the light beams are imaged out of focus on the projection plane. This defocusing of the light beams in the projection plane is particularly recognizable by the fact that the border rays of the light beams are imaged out of focus in the projection plane. Moreover, the device is implemented in such a way that the light beams passed through lens elements which are associated with the second groups illuminate only a part of the projection face in the projection plane. In other words, the defocused image results in a locally dependent intensity distribution on the projection plane, with a maximum of the intensity in the center area, a decrease of the intensity towards the periphery and without a sharp, recognizable boundary.

This provides the possibility of illuminating, for example, the center area more intensively than the peripheral areas. Moreover, an arbitrary intensity distribution on the projection face can be realized.

Due to the defocused image of the light beams passed through the second groups of lens elements, the border rays of the light beams are also imaged out of focus on the projection face so that the boundaries are visually inconspicuous. This is important because these light beams illuminate partial areas only whereas, in other cases, their boundaries would be recognizable.

This device provides the possibility of distributing the intensity on the display in a desired manner by choosing the number and implementation of the lens elements of the second groups on the first and the second lens plate. The other advantages of such devices, namely the color-homogeneous illumination, the light distribution independent of inhomogeneities of the light source and the light distribution insensitive to instabilities of the position of the light source are maintained.

In accordance with an embodiment of the invention, the partial face, which is illuminated by light beams passed through the second groups of lens elements of the first lens plate and the second lens plate, is arranged in a center area of the projection face.

Advantageously, the device may be implemented in such a way that the light beams passed through the second groups of lens elements illuminate a partial area preferably in the center of the projection face. A high illumination intensity is then achieved in this area. This is often desirable because the intensity achieved in the center of the projection face is an important criterion in the sale of such devices. An intensity decreasing towards the periphery of the projection face is often not very conspicuous because, for example, video films for which such optical projection devices can be used are often displayed in a dark ambience, so that a certain decrease of light intensity is admissible and may even be desirable in the peripheral areas of the dark room.

A further embodiment of the invention is characterized in that the lens elements of the first and second groups have the same aspect ratio as the projection face.

It is achieved by this measure that the partial faces which are illuminated by light beams passed through lens elements of the second groups on the first and the second lens plate have the same aspect ratio as the projection face. A uniform decrease of the light intensity, for example, towards the edges is then obtained on all sides. If these illuminated partial faces have the same aspect ratio, they are optically not very conspicuous.

In accordance with a further embodiment of the invention, the lens elements of the first lens plate of the second group are smaller than the lens elements of the first lens plate of the first group.

The smaller implementation of the lens elements on the first lens plate of the second group and the lens elements on this lens plate of the first group provides a simple possibility of achieving the desired effect of imaging the light beams passed through the second groups of lens elements in a smaller size on the projection face than the light beams passed through the first groups of lens elements. The additionally required defocusing of the light beams passed through the second groups should be realized by additional measures, for example, by implementation of the corresponding associated lens elements of the second group on the second lens plate or by a corresponding implementation of a condenser lens.

In accordance with a further embodiment of the invention, at least some of the lens elements on the first lens plate of the second group are arranged at the outer area.

The lens elements on the first lens plate of the second group are preferably arranged at the outer area because the light source has a smaller light intensity in this area anyway. The higher intensity in the center area can then be utilized for the light beams passed through the first groups of lens elements and illuminating the projection face completely. The light beams passed through the second group of lens elements and illuminating partial faces only may have a smaller intensity, so that the lens elements on the first lens plate, associated with this group, are advantageously arranged at the outer area.

In accordance with a further embodiment of the invention, the lens elements on the first lens plate of the first group and the associated lens elements on the second lens plate have a different distance relative to one another than the lens elements on the first lens plate of the second group and the associated lens elements on the second lens plate.

In such a device, the lens elements on the first and the second lens plate of the first group may be advantageously arranged in such a way that they are sharply imaged on the projection plane and completely illuminate the projection face in the projection plane. The lens elements on the two lens plates of the second groups have, however, a different distance relative to one another, with the result that the light beams passed through these lens elements do not completely illuminate the projection face in the projection plane, and that the light beams are not focused in the projection plane because the different distance between the lens elements leads to focusing of the light beams passed through these elements on a plane in front of or behind the projection plane. Thus, both desired effects are achieved by these different distances between the lens elements of the two groups.

In accordance with a further embodiment of the invention, these effects can also be achieved in that the radiation path between the second lens plate and the projection plane incorporates a correction lens which changes the scale of the light beams passing through this lens and originating from the lens elements of the first groups in such a way that they are focused on the projection plane and illuminate said plane completely, and in that the light beams not passing through the correction lens and originating from lens elements of the second groups are focused on a plane in front of or behind the projection plane and illuminate said plane only partially.

Such a correction lens may advantageously be arranged in the center area of the radiation path. The device is therefore implemented in such a way that those light beams, which are preferably passed through lens elements of the first groups arranged in the center area of the lens elements, are also passed through this correction lens. The device is then implemented in such a way that these light beams, which are passed through the correction lens, are sharply imaged on the projection face. The light beams passed through lens elements of the second groups are, however, not influenced by the correction lens and are consequently imaged out of focus on the projection plane and thus do not fully illuminate the projection face.

It is principally also possible to work the other way around, i.e. the light beams passed through the second groups of lens elements are passed through the correction lens and the device is implemented in such a way that these light beams are imaged out of focus on the projection plane and illuminate only a part of the projection face.

In accordance with a further embodiment of the invention, a polarizing beam splitter is arranged in the radiation path, having optical paths of different lengths for light rays incident thereon in different planes of polarization, and the beam splitter splits the light incident thereon into light beams sent to lens elements on the second lens plate of the first group and into light beams sent to lens elements on the second lens plate of the second group.

Such a polarizing beam splitter guides light rays incident thereon with different optical paths within the beam splitter. The criterion is the direction of polarization of the light beams. It is thereby achieved that light is introduced into the beam splitter with paths of different lengths, dependent on the direction of polarization. According to the invention, such a beam splitter may advantageously be used for splitting the light incident thereon into two large light beams with varying planes of polarization. One light beam is sent to lens elements of the first groups and the other light beam is sent to lens elements of the second groups. A corresponding arrangement of the polarizing beam splitter in the radiation path can then lead to different optical ratios for the light beams of the first groups than for light beams passed through lens elements of the second groups. These different optical ratios may be used, on the one hand, for focusing light beams passed through lens elements of the first groups sharply on the projection face and illuminating this face completely and, on the other hand, imaging the light beams passed through lens elements of the second groups out of focus in the projection plane and only on a part of the projection face.

For all of these possible variants, a further embodiment of the invention is characterized in that approximately 20 to 50% of the lens elements of the lens plates are associated with the second group.

In accordance with a further embodiment of the invention, such an optical projection device may be used advantageously for a video projector. This video projector is characterized in that the projection plane is implemented as an LCD element which is driven in dependence on a picture signal, and in that at least a projection objective and an image projection screen are arranged in the radiation path behind the LCD element. The properties of the device according to the invention may be used particularly for such video projectors because the video projector can thus achieve a high intensity of central light on the projection face.

These and other aspects of the invention are apparent from and will be elucidated with reference to the embodiments described hereinafter.

DESCRIPTION OF THE PREFERRED EMBODIMENTS

Figure 1:
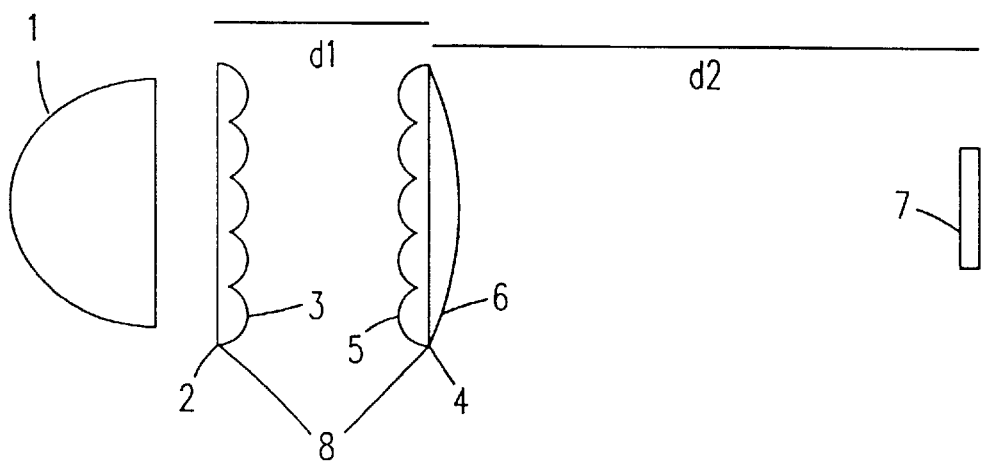
FIG. 1 shows diagrammatically an optical projection device including a lens plate integrator.

FIG. 1 shows diagrammatically an optical projection device including a lens plate integrator.

The device comprises a light source 1 whose light is incident on a first lens plate 2 which comprises individual lens elements 3. The radiation path behind the first lens plate 2 incorporates a second lens plate 4 which comprises lens elements 5. A condensor lens 6 is arranged at the second lens plate 4. A projection plane 7 is indicated in the radiation path behind the second lens plate 4.

The first lens plate 2 and the second lens plate 4 jointly constitute a lens plate integrator 8.

The light emitted by the light source 1 is imaged on associated lens elements 5 of the second lens plate 4 by means of the lens elements 3 on the first lens plate 2. Generally, each lens element 3 of the first lens plate 2 is exactly associated with a lens element 5 of the second lens plate 4. The light beams then passed through the lens elements 5 of the second lens plate 4 are either concentrated by means of a prismatic arrangement (not shown) of the lens elements 5 of the second lens plate 4, or by means of a condensor lens 6 shown in FIG. 1, and are superimposed on each other in the projection plane 7.

The equation for imaging $$1/f = 1/d_1 + 1/d_2$$

then holds, in which f is the overall focal length of the lens elements 5 of the second lens plate 4 and the condensor lens 6, $d_1$ is the distance between the two lens plates and $d_2$ is the distance between the second lens plate 4, including the condensor lens 6, and the projection plane 7.

If this equation is satisfied, the light beams passed through the lens plate integrator are sharply imaged on the projection plane 7. In a corresponding implementation of the device, a projection face is then fully illuminated.

Figure 2:
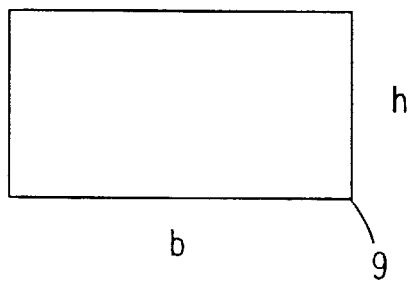
FIG. 2 shows diagrammatically a projection face of the device shown in FIG. 1.

Such a projection face 9. as may be present in the projection plane 7 of the device shown in FIG. 1, is shown by way of example in FIG. 2. The projection face 9 has a width b and a height h which is completely illuminated in state-of-the-art optical projection devices by corresponding lens plate integrators with all the light beams passed through the individual lens elements, the light beams being focused on the projection face 9 present in the projection plane 7. The lens plate elements on the first lens plate have the same aspect ratio as the projection face.

The invention provides these optical ratios for some lens elements. A first group of lens elements is provided for which these ratios are valid. However, a second group of lens elements is provided on both lens plates, which group does not focus the light beams passed through these elements on the projection plane 7, which beams only partly illuminate the projection face 9. Four embodiments of the optical projection device according to the invention will hereinafter be elucidated with reference to FIGS. 3 to 6.

Figure 3:
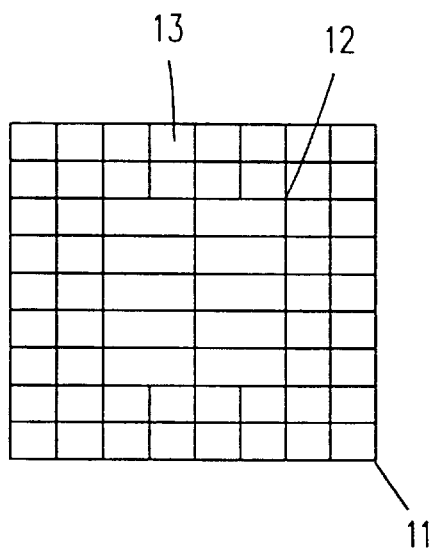
FIG. 3 shows a first lens plate of a first embodiment of the optical projection device according to the invention.

FIG. 3 shows a first lens plate 11 in a first embodiment of the optical projection device according to the invention. The device principally resembles that of FIG. 1, but instead of the first lens plate 2 in FIG. 1, the lens plate 11 is shown in FIG. 3.

Lens elements 12 having a larger format than lens elements 13 arranged in a peripheral area are arranged in a center area of the lens plate 11 shown in FIG. 3.

The larger lens elements 12 arranged in the center area are associated with the first group of lens elements. Light beams which are focused on the projection plane and illuminate the projection face 9 completely are passed through these lens elements and corresponding lens elements of the first group on the second lens plate (not shown). In a very simple case, the second lens plate may be identical to the first.

Light beams which illuminate only parts of, for example, the projection face 9 in FIG. 2 are passed through the lens elements 13 arranged at the peripheral area of the first lens plate 11 and associated with a second group, and through associated lens elements of a second group on a second lens plate. As far as the device shown in FIG. 1 is concerned, this also means that the light beams are not focused on the projection plane 7. Instead, they are focused on a plane in front of or behind this plane 7 so that the light beams are imaged out of focus on the projection plane 7 and on the associated projection face 9 in FIG. 2.

The device may be implemented, for example, in such a way that the lens elements 13 of the first lens plate 11 and the associated lens elements of the second group of the second lens plate are preferably imaged on a center area of the projection plane 9 in FIG. 2. A higher light intensity is thereby achieved in the center area.

Figure 4:
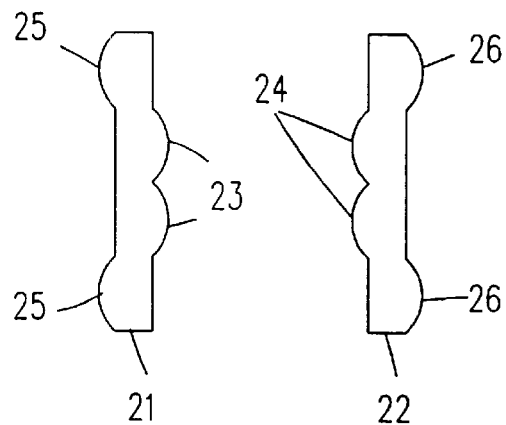
FIG. 4 shows a first and a second lens plate of a second embodiment.

FIG. 4 shows a first lens plate 21 and a second lens plate 22, as may be used, for example, in the device of FIG. 1 instead of the lens plates 2 and 4 shown in this Figure. In this second embodiment of the invention, the lens plates 21 and 22 are implemented in such a way that the lens elements of the two groups have a different distance relative to one another.

Lens elements 23 of the first group are arranged in the center area of the first lens plate 21. First lens elements 24 of the second lens plate 22 associated with these first lens elements 23 of the first lens plate 21 are arranged on the second lens plate 22.

Lens elements 25 of a second group are arranged in the peripheral area of the first lens plate 21. The second lens plate 22 comprises lens elements 26 which also belong to the second group and are also arranged at the peripheral area of this plate.

If a lens plate 21 as in FIG. 4 is provided instead of the first lens plate 2 shown in FIG. 1, and if a lens plate 22 as in FIG. 4 is provided instead of the second lens plate 4 shown in FIG. 1, a different optical effect is achieved due to the different distances between the lens plates of the two groups, which effect may be used to image the light beams on the projection plane in different sizes and a different focusing.

FIG. 4 shows that the lens elements of the first groups, namely the lens elements 23 on the first lens plate 21 and the lens elements 24 on the second lens plate 22 have a clearly smaller mutual distance than the lens elements 25 of the first lens plate 21 and the lens elements 26 of the second lens plate 22 of the second groups.

The overall device may be advantageously implemented in such a way that the light beams passed through the first lens elements 23 and 24 of the two lens plates 21 and 22 are sharply focused on the projection plane 7, as in FIG. 1, and completely illuminate a projection face 9, as in FIG. 2. However, due to the larger distances between the second lens elements 25 on the lens plate 21 and the second lens elements 26 on the lens plate 22, the effect is achieved that the light beams passed through these lens elements, as shown in FIG. 1, are imaged out of focus on the projection plane 7. As is illustrated in FIG. 2, the projection face 9 is then only partly illuminated. Here again, the light beams passed through the lens elements 25 and 26 can advantageously illuminate the center area.

Figure 5:
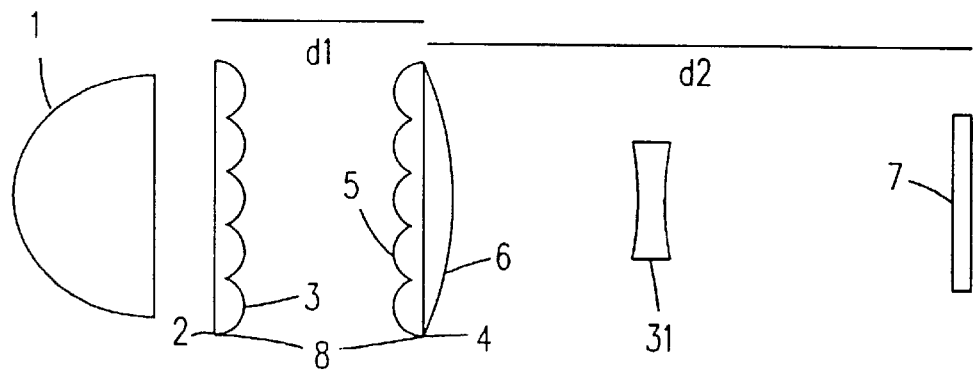
FIG. 5 shows diagrammatically a third embodiment of an optical projection device according to the invention.

FIG. 5 shows a third embodiment of the optical projection device according to the invention.

The device shown in FIG. 5 substantially corresponds to the device of FIG. 1, but the radiation path between the second lens plate 4 and the projection plane 7 incorporates a correction lens 31. The correction lens 31 is implemented and arranged in such a way that it passes those light beams which are passed through lens elements of the first groups of lens elements arranged on the two lens plates 2 and 4. These lens elements of the first group, which are not further shown in FIG. 5, are implemented together with the condenser lens 6 and the correction lens 31 in such a way that the light beams passing through these elements are focused on the projection plane 7 due to the influence of the correction lens 31. Moreover, these light beams completely illuminate projection faces in this projection plane 7. Advantageously, the lens elements of the two lens plates of the second groups may be implemented identically as the lens elements of both plates of the first groups. Since the light beams passed through these lens elements of the second groups are not passed through the correction lens 31, different optical ratios apply to these light beams, so that they are imaged out of focus in the projection plane 7 and illuminate only a part of the projection face.

Principally, these optical ratios can be reversed, with the correction lens 31 then being used to image the light beams passed through the first lens elements out of focus on the projection plane 7.

Figure 6:
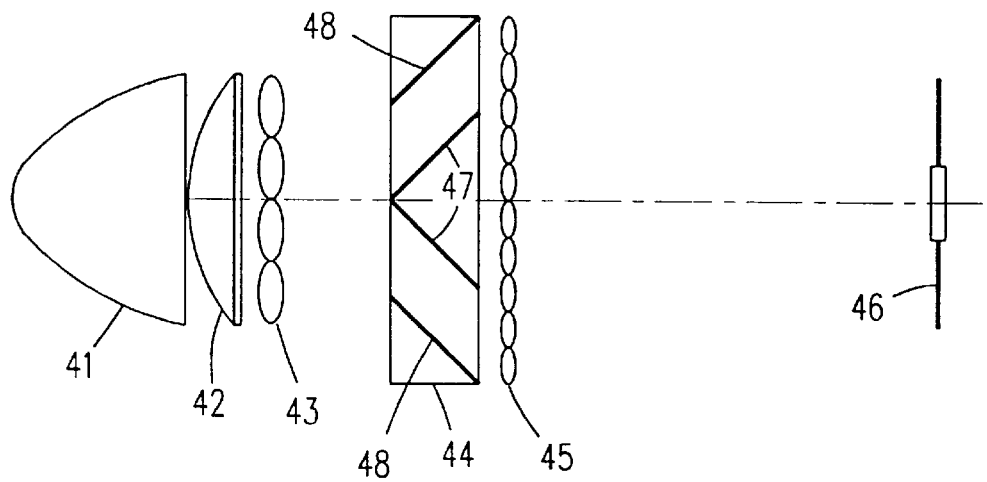
FIG. 6 shows diagrammnatically a fourth embodiment of the optical projection device.

FIG. 6 shows a fourth embodiment of the optical projection device according to the invention. This device also includes a light source 41. The radiation path behind the light source 41 incorporates a condenser lens 42, behind which a first lens plate 43 is arranged. Behind the first lens plate 43, the light is incident on a polarizing beam splitter 44 preceding a second lens plate 45 in the radiation path. Behind the second lens plate 45, the light is incident on a projection plane 46. Polarizing beam splitters are used for polarizing the light of the lamp without any losses and are described, for example in Patents WO 95/33222 or U.S. Pat. No. 5,295,018.

In this embodiment, the lens elements on the first lens plate 43 and on the second lens plate 45 of the two groups are implemented identically, i.e. the lens elements on the first lens plate 43 are mutually identical, similarly as the lens elements on the second lens plate 45. The different optical ratios for the light beams which are passed through lens elements of the first groups and lens elements of the second group are achieved by the polarizing beam splitter 44.

Light, which is incident on this beam splitter 44 in a first plane of polarization, is reflected by a reflection device 47 within this beam splitter and reflected again by further reflectors 48, so that the light is incident via this diversion on the second lens plate 45 where it is incident on the lens elements of the second group. The device for complete polarization of the light beam rotates the plane of polarization of this light by 90°, using a $\lambda/2$ plate. This plate may be arranged in the optical path in front of or behind the second lens plate.

Light, which is incident on the polarizing beam splitter 44 in a second plane of polarization, is, however, not reflected by the reflectors 47, but passes these reflectors. The light is then incident via a much shorter optical path on the lens elements of the second lens plate 45 of the first group.

Clearly different optical ratios are then achieved for the light beams which are passed through the lens elements of the second lens plate 45 of the first group, as compared with the light beams which are passed through second lens elements of the lens plate 45.

These different optical ratios are used to image the light beams passed through the lens elements of the first group of the second lens plate 45 sharply on the projection plane 46 and to completely illuminate a projection face (not shown) in this projection plane. The light beams which are passed through the lens elements of the second lens plate 45 of the second group via a path which is optically considerably longer are imaged out of focus on the projection plane 46 and illuminate only a part of the projection face in this projection plane.

Figure 7:
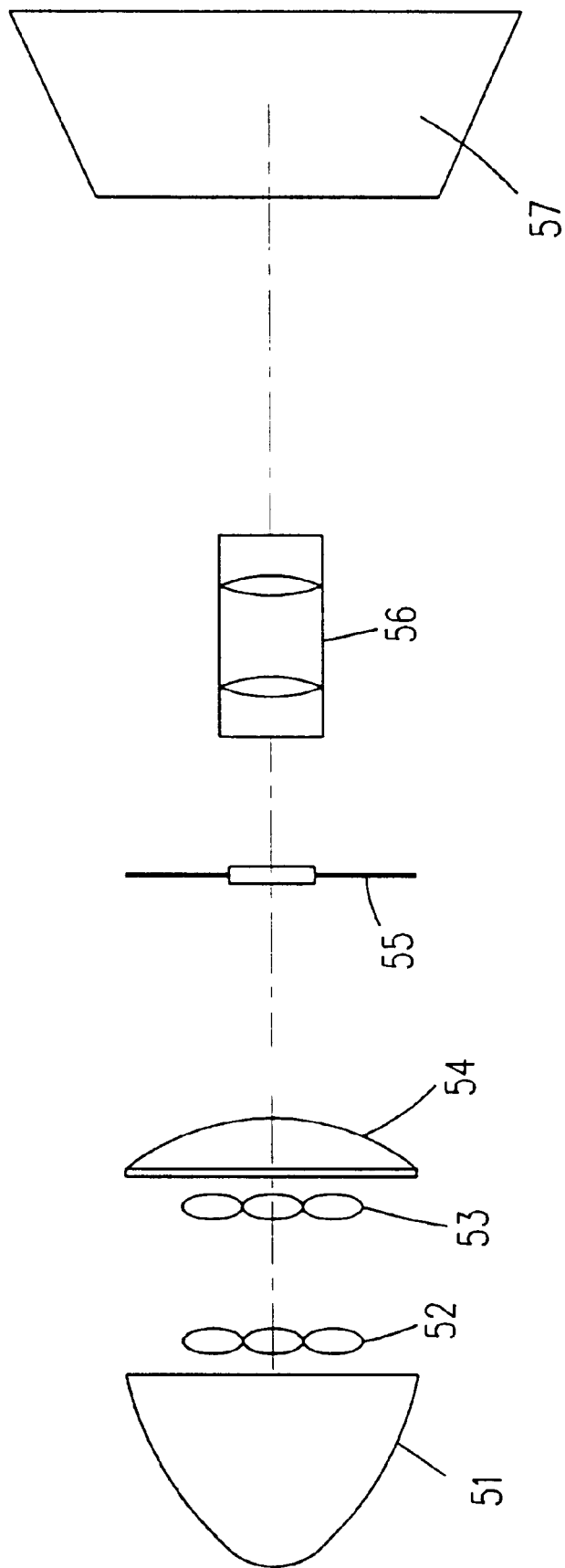
FIG. 7 shows diagrammatically a video projector including the optical projection device according to the invention.

FIG. 7 shows a video projector which may be used advantageously for the image projection device according to the invention. FIG. 7 shows diagrammatically the light source 51, the first lens plate 52, the second lens plate 53 and the condensor lens 54. These elements may be implemented in conformity with one of the four embodiments as shown in FIGS. 3 to 6, and are not shown in greater detail in FIG. 7.

In accordance with one of the embodiments according to the invention, only a part of the light beams is sharply imaged on a projection plane shown in FIG. 7, which fully illuminates a projection face in the projection plane 55. Another part of the light beams is imaged out of focus on this plane and illuminates the projection face only partially.

In the video projector of FIG. 7, this projection plane c.q. projection space is realized by an LCD (Liquid Crystal Display) element. The light incident on this LCD element 55 is modulated in dependence on a picture signal, not shown in FIG. 7, driving individual pixels of the LCD, so that it is imaged behind the LCD element 55 on an image projection screen 57 by means of a projection objective 56.

For such a video projector, the optical projection device may be advantageously used for a more intensive illumination of the center area of the LCD element 55 and hence the center area of the image projection screen 57 than their peripheral areas. A high light intensity is then achieved in the center.

We claim:

1. An optical projection device comprising a light source which emits light on an optical path toward a projection plane, a first lens plate which receives light on said optical path, said first lens plate comprising first and second groups of lens elements, a second lens plate which receives light from said first lens plate on said optical path, said second lens plate comprising a first group of lens elements which passes light from said first group of lens elements of said first plate, and a second group of optical elements which passes light from said second group of elements of said first plate, and means for superimposing the light from the first and second groups of said second lens plate on said projection plane, said light from said first group being focused on said projection plane and illuminating a projection face in said projection plane, said light from said second group being focused in front of or behind the projection plane and illuminating only part of said projection face.

2. An optical projection device as in claim 1 wherein said light from said lens elements of said second group of said second lens plate illuminates said projection area with a locally dependent intensity distribution having a maximum in a central area of said projection face and a peripheral decrease of intensity without a sharp, recognizable boundary.

3. An optical projection device as in claim 1 wherein the lens elements of the first and second groups of the first plate have the same aspect ratio as the projection face.

4. An optical projection device as in claim 1 wherein the lens elements of the second group of the first plate are smaller than the lens elements of the first group of the first plate.

5. An optical projection device as in claim 1 wherein at least some of said lens elements of said second group of said first plate are arranged peripherally of said lens elements of said first group of said first plate.

6. An optical projection device as in claim 1 wherein said lens elements of said first group of said first plate are arranged a first distance from said lens elements of said first group of said second plate, and said lens elements of said second group of said first plate are arranged a second distance from said lens elements of said second group of said second plate, said first and second differences being different.

7. An optical projection device as in claim 1 further comprising a correction lens on said optical path between said second lens plate and said projection plane, said correction lens focusing light from said first groups of lenses onto said projection plane and illuminating said projection face completely.

8. An optical projection device as in claim 1 further comprising a polarizing beam splitter on said optical path between said first and second lens plates, said beam splitting light from said first lens plate into light which is sent to said lens elements of first group of said second lens plate on a first optical path, and light which is sent to said lens elements of said second groups of said second lens plate on a second optical path.

9. An optical projection device as in claim 1 wherein 20 to 50% of the lens elements of the lens plates are in the second groups.

10. A video projector comprising an optical projection device as in claim 1 wherein said device further comprises an LCD element in said projection plane, said LCD element being driven in dependence on a picture signal, a projection objective on said optical path behind said LCD element, and an image projection screen on said optical path behind said projection objective.

\* \* \* \* \*